Nov. 18, 1958 N. WEINTRAUB 2,861,257
POWER LINE RELAYING
Filed Sept. 22, 1953 2 Sheets-Sheet 1

INVENTOR
NELSON WEINTRAUB
BY Percy P. Lantzy
ATTORNEY

POWER LINE RELAYING

Filed Sept. 22, 1953 2 Sheets-Sheet 2

INVENTOR
NELSON WEINTRAUB
BY Percy P. Lantzy
ATTORNEY

United States Patent Office 2,861,257

Patented Nov. 18, 1958

2,861,257

POWER LINE RELAYING

Nelson Weintraub, Irvington, N. J., assignor to International Telephone and Telegraph Corporation, Nutley, N. J., a corporation of Maryland Application September 22, 1953, Serial No. 381,705

10 Claims. (Cl. 340—163)

This invention relates to power line relaying and more particularly to pulse time modulation (PTM) microwave relay systems incorporating power line relaying facilities and having means to eliminate false relaying due to the malfunctioning of the microwave relay system.

Utilities find it extremely important to have reliable and continuous communication available to any and all points along their power distribution and transmission lines. The communication system used must provide telemetering, communication, and any other communication facilities that may be required. In the past, wire lines or power line carrier equipment has been widely used to provide these important and necessary services. Now, however, microwave radio communication equipment is coming to the front as the best means of providing the necessary communication required in conjunction with the operation of power lines.

Radio microwave communication equipments have been designed to include provisions for multichannel operation by the use of multiplexing. The two most widely used systems of multiplexing are termed time division and frequency division multiplexing. The equipment selected for this illustration employs time division multiplexing. Such a multiplexing arrangement employs pulse modulation for conveying the desired intelligence and has the inherent characteristic that only a single increment of a signal is transmitted at any one instant of time; that is, increments of each channel are transmitted in time sequence. Several types of pulse modulation systems are available, such as pulse amplitude modulation (PAM), pulse time modulation (PTM), pulse width modulation (PWM) and pulse code modulation (PCM). The description of the novel circuitry of this invention will be described with respect to a pulse time modulation as used in a time division multiplex system.

The utility companies employing a microwave communication system to enable the system operator to have available at all times a complete picture of the condition over which he is to exercise control must be provided with a channel arrangement which provides facilities including communication for either trunk or party-line service, telemetering, supervisory control, fault alarm, and power relaying. An example channel arrangement may consist of five PTM channels with the first three channels allocated to telephone service, the fourth channel allocated to tone signalling, and the fifth channel allocated to power line relaying. The telephone channels would provide on channel #1 a service channel including dial selective calling, fault alarm, and VHF control tones, on channel #2 a trunk circuit including dialing and supervision, and on channel #3 a party line including ring down. Channel #4, the tone signalling channel, would include a plurality of tone channel superimposed and frequency spaced upon the PTM channel to appropriately provide the desired telemetering and supervisory control. Channel #5, the power line relaying channel, would provide a plurality of signal channels including predetermined frequency signal or tone combinations superimposed upon the single PTM channel to enable the shifting of a power load from one point to another, putting equipment in service and taking equipment out of service, and so forth. It is this latter channel to which this invention is specifically directed.

Power line relaying as it is normally used in conjunction with a microwave relay link employs one PTM channel of a time division multiplex system. This one PTM channel may carry thereon one, two or more signal channels with the plurality of signal channels related with respect to frequency. The signal channels transmit and receive a given tone signal or a predetermined combination of tone signals within the audio frequency range, 200–3300 C. P. S. The number of signal channels and the number of tones or tone combinations employed therein depend upon the desired operation to be performed, the sharpness of the tone transmitters, and the narrowness of the relay receiver bands as the stacking of the tone signals in a relay channel are increased.

Let us consider for purposes of explanation a power line relaying system having two signal channels per PTM channel with each signal channel including two tone signals predeterminedly related in frequency. To have efficient relaying operation, such as the operation of circuit breakers, two requirements must be met. First, the two tones must be present, and second, the overall system must have low noise. The tones may become lost due to malfunctioning of the PTM system causing wrong or inefficient relay operation. The presence of large noise may overshadow or drown out the relay tone signal, or may simulate a relay tone causing wrong or inefficient relayed information.

It is therefore an object of this invention to provide power line relaying or monitoring on a pulse microwave communication system having freedom from false relaying due to malfunctioning of the pulse system.

Another object of this invention is the modification of a pulse communication system having power line relaying facilities to include control means at the receiving end of said power line relaying facilities to substantially eliminate false relaying due to the loss of the tone signal and/or presence of abnormal "noise" or other interference.

A feature of this invention is the provision of a noise monitor for detecting noise energy on the marker signal of a train of channel pulses and an electronic switch responsive to detected noise energy above a given level to inactivate or block the operation of the relay receivers.

Another feature of this invention is the provision of a channel monitor for detecting the presence or absence of the tone signal carried by the pulse channel utilized for power line relaying and an electronic switch responsive to the absence of said tone signal of predetermined intensity to inactivate or block the operation of the relay receivers.

A further feature of this invention is the combination of the noise monitor, the channel monitor, and an electronic switch arrangement common to both of said monitors to deactivate the tone receivers if the system noise becomes excessive and if the control tones are absent, or a combination of such pulse system malfunctioning.

Still another feature of this invention is the provision of a noise monitor including therein a pulse channel demodulator to enable the detection of the noise present on the marker signal of the pulse train, the amplitude of the noise recovered by the demodulation of said marker signal being representative of the system noise, which when exceeding a given level causes the operation of the tone receivers to be deactivated through the cooperation of an electronic switch.

The above-mentioned and other features and objects of this invention will become more apparent by reference to the following description taken in conjunction with the accompanying drawings, in which.

Figure 1:
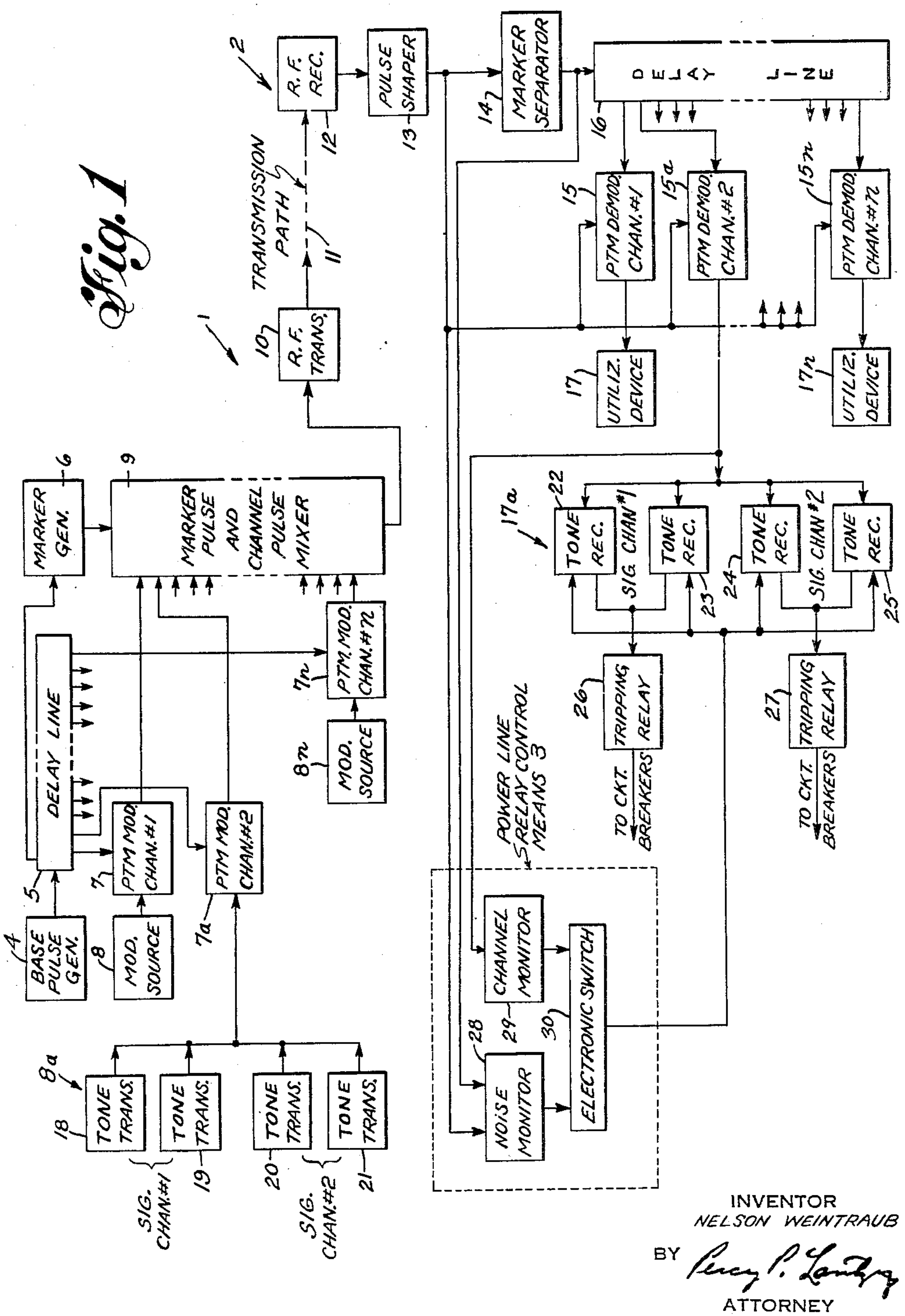
Fig. 1 is a diagram in block form of a PTM microwave communication system incorporating power line relaying facilities including the control circuitry in accordance with this invention.

Referring to Fig. 1, a microwave communication system of the pulse time modulation, time division multiplex type is illustrated as comprising a transmission terminal 1 and receiving terminal 2 having power line relay facilities including relay control means 3 at terminal 2 to assure proper and efficient functioning of the power line relaying substantially without influence from malfunctioning of the communication equipment.

Transmission terminal 1 is shown to comprise a base pulse generator 4 for production of a timing pulse repetitious at a given basic frequency whose output is coupled to delay line 5. Delay line 5 includes a plurality of taps disposed therealong for removing pulses therefrom in a predetermined time relationship, one of said taps to activate marker generator 6 and the other of said taps to provide successively delayed pulses for time modulation in channel modulators 7 in accordance with the signals of modulation sources 8.

The marker generator 6 may be any suitable device capable of producing a pair of pulses, designated as the marker signal, each pulse of the pair being of very short duration and being spaced closely together so as to be easily distinguished from the channel pulses. Such a marker generator is fully described in the patent to D. D. Grieg, Serial No. 2,485,591, filed October 25, 1949, entitled "Multichannel System." Generator 6 employed herein and fully described in the above patent may be activated from any pulse source, but preferably from the same source as used for producing the time displaced channel pulses, such as generator 4 herein illustrated. The output of generator 4 is coupled to a suitable reflecting delay line contained in generator 6 to produce two positive pulses of very short duration and spaced very closely together providing for easily distinguishing the marker pulse from the individual channel pulses contained in the multichannel pulse wave.

The channel modulators 7 may be any suitable device activated by a pulse source, the pulse of a given delay tap on delay line 5, and signal energy from signal or modulation sources 8 for production of time modulated channel pulses. Such a modulator unit is shown and described in the previously cited Grieg patent. Modulating sources 8 may be any desirable source consistent with the utilities requirements such as voice, telephone circuits, tone signalling, and power line relaying signal generators as illustrated for descriptive purposes as source 8*a*.

The channel pulse outputs of modulators 7 are modulated by signal energy from sources 8 to produce a time displacement of the various channel pulses from their respective quiescent points, the time displacements being representative of the modulating signal energies. These time modulated channel pulses are applied to mixer 9 wherein the pulses of the various channels plus the marker pulse are amplified and interleaved in a time relationship as established by delay line 5. The mixer 9 may be similar to the mixer of the above cited patent. Mixer 9 should include therein a suitable device for interleaving or combining the trains of pulses from each one of the modulators 7 plus the marker pulse from generator 6, so that the energy in one channel pulse train will not be fed back into the circuit of another. Suitable means for accomplishing this is to provide a parallel arrangement of triodes in which the separate channel pulse trains are applied to the appropriate grids of the plurality of triodes and the plate circuits thereof are combined. The resulting output from mixer 9 is coupled to the R.-F. transmitter 10 for translation of the multiplexed channel pulse trains into R.-F. energy for transmission over a transmission path 11 which in a microwave communication system is usually a radio link. However, under certain conditions the path 11 may be a suitable transmission line interconnecting terminal 1 with terminal 2.

Radio frequency receiver 12 receives from transmission path 11 the R.-F. energy representative of the multiplexed channel pulse trains wherein the R.-F. energy is translated to the train of channel pulses time displaced in accordance with the signal from sources 8. The output of receiver 12 is coupled to pulse shaper 13 which functions in a known manner to reshape the individual channel pulses and to remove extraneous information from the top and bottom of the channel pulses. The reshaped output of shaper 13 is then coupled to both the marker separator 14 and the individual channel demodulators 15.

The marker separator 14 functions in a manner as illustrated in the above cited Grieg patent to remove the marker signal from the reshaped multichannel pulse train which is employed to develop a gating pulse. The gating pulse is coupled to delay line 16 having delay taps thereon which imparts a predetermined delay to the gating pulse substantially identical with the delay timing of delay line 5, each of the appropriately delayed outputs of delay line 16 sequentially gating or triggering demodulators 15 for recovery of the information carried by their respective channel pulse.

Demodulators 15 may be any device capable of removing from the multichannel pulse wave from shaper 13 their appropriate individual channel pulse trains under the gating action of the delay tap outputs of delay line 16 and performing a demodulation action thereon, conversion of pulse time modulation to pulse width modulation and extraction of the audio component from said width modulation to reproduce the modulating signal present in each channel. Such a device is described in detail in the cited patent to Grieg. The resulting modulating or intelligence signal at the outputs of demodulators 15 are coupled to utilization devices 17 consistent with the type of device employed as the modulation sources 8.

Having outlined the structural arrangement and functioning of the microwave communication system and the various components therein, the reader's attention is directed to PTM channel #2 including modulating source 8*a*, channel modulator 7*a* at the transmitting end and the demodulator 15*a*, utilization device 17*a* at the receiving end for a brief description of representative power line relaying components useful in describing the operation of control means 3 in accordance with this invention.

Referring again to Fig. 1, there is illustrated for modulation source 8*a* two signal channels including respectively tone transmitters 18 and 19 and tone transmitters 20 and 21. The tone transmitters generate given tone signals predeterminedly related in frequency to enable a relay operation at the receiving end of the microwave communication system. The tones generated by relay transmitters 18–21 may, for example, be at the frequencies of 2100, 2400, 2700 and 3000 C. P. S., respectively. These four tone signals occurring in the audio frequency range modulate a quiescent channel pulse delivered from delay line 5 to the PTM channel modulator 7*a*. The output of modulator 7*a* is applied to channel pulse mixer 9 for mixing with the other channel pulses and marker signal to form a portion of the PTM pulse train for application to the radio frequency transmitter 10.

The PTM channel pulse of channel #2, modulated in accordance with the four tone signals making up the two signal channels, is transmitted along transmission path 11 as a portion of the pulse train wave, the pulse train is received by receiver 12, shaped by pulse shaper 13, and applied to PTM demodulator 15a. Demodulator 15a separates PTM channel #2 pulse from the pulse train wave and demodulates the separated channel pulse as hereinabove outlined. The recovered tone signals are then applied to the utilization device 17a.

Utilization device 17a is shown to include tone receivers 22 and 23 for signal channel #1 and tone receivers 24 and 25 for signal channel #2. These tone receivers preferably are sharply tuned for receipt of their corresponding tone signals and rejection of the other tone signals presented at their input. It is necessary for both tone receivers of each signal channel to be activated by the designated tone signal to produce an output sufficient for activating the tripping relays 26 and 27 which activate circuit backers, or other devices, for control of power distribution, or other relaying functions.

As outlined hereinabove for proper power line relaying, it is necessary that the microwave communication system have low noise and that the tone signals be present for efficient relay action. To assure that these two conditions are present the inventor has provided a relay control means 3 including noise monitor 28 and channel monitor 29 which function to respectively monitor the noise present in the communication system and the presence or absence of the relay tone signals. If the system noise should become excessive and/or the tones be absent, an output will be produced from monitors 28 and 29 for activation of electronic switch 30. Switch 30 in turn produces a negative output to block the operation of tone receivers 22, 23, 24 and 25 to eliminate the possibility of falsely activating relays 26 and 27.

Figure 2:
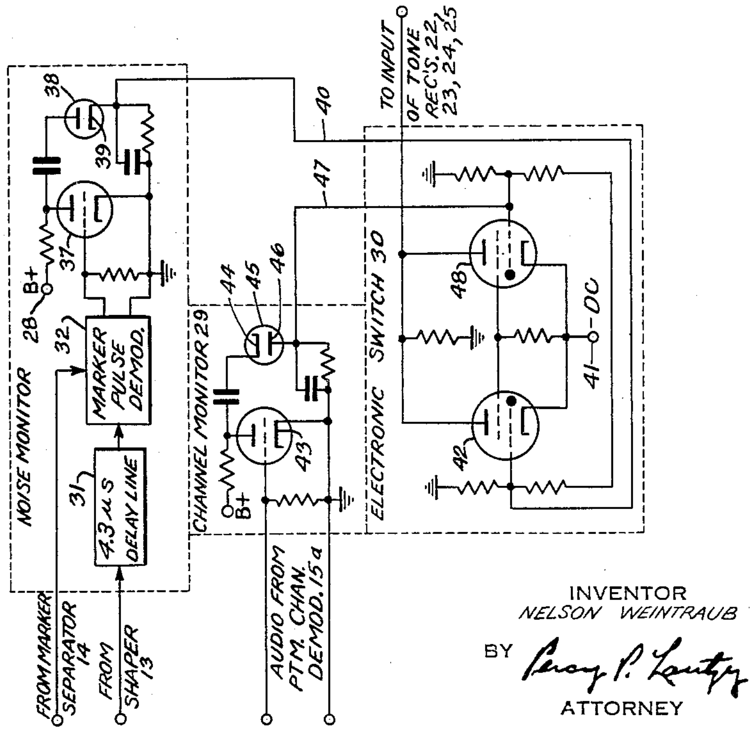
Fig. 2 is a schematic diagram of the control circuitry of Fig. 1.

Referring to Fig. 2, a schematic diagram of power line control means 3 is illustrated to more fully describe the structure and functioning of noise monitor 28 and channel monitor 29 in combination with electronic switch 30. Turning first to the noise monitor 28, the operation thereof is such as to monitor or observe the amplitude of the noise present on the marker signal of the PTM pulse train. Noise monitor 28 is illustrated as comprising a delay line 31 receiving from shaper 13 the entire reshaped pulse train for delaying said pulse train 4.3 microseconds before application to a pulse demodulator 32. Marker pulse demodulator 32, identical in structure to channel demodulators 15, a full description being contained in the cited Grieg patent, is appropriately gated by the output of marker separator 14, the same gating output that is applied to delay line 16 for successive gating of channel demodulators 15.

Figure 3:
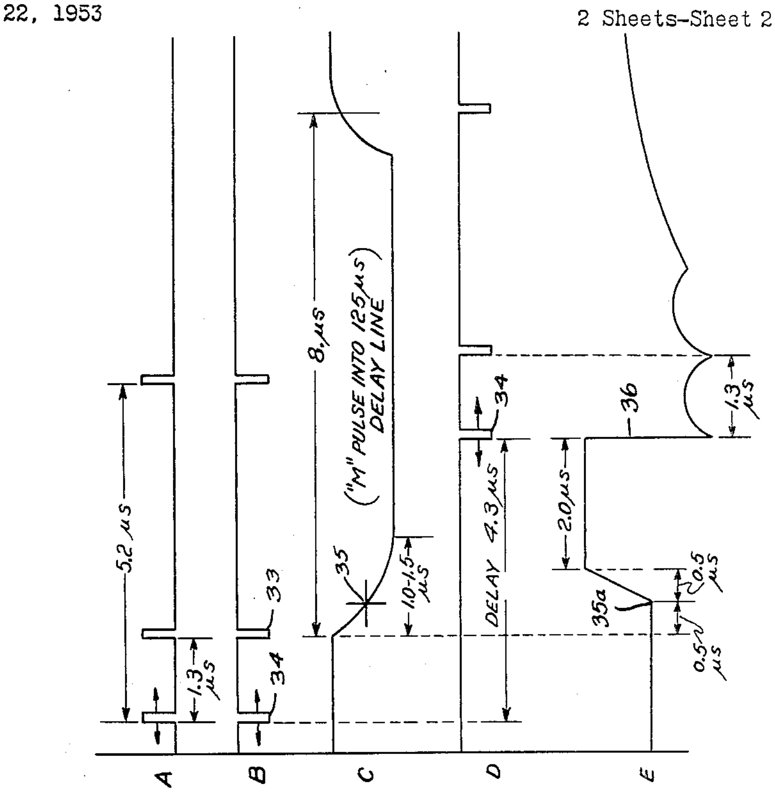
Fig. 3 illustrates graphically the functioning of the marker demodulator of Fig. 2.

Fig. 3 illustrates the necessity for delaying the pulse train 4.3 microseconds in delay line 31. The PTM pulse train marker signal, as indicated in curve A of Fig. 3, includes two narrow pulses whose leading edges are separated by 1.3 microseconds. The curve B illustrates graphically the inversion of the marker signal of curve A as accomplished in shaper 13. The action of marker separator 17 to provide a gating pulse for delay line 16 and the marker pulse demodulator 32, as shown in curve C is initiated by the leading edge of pulse 33 of the marker signal, thereby imparting a 1.3 microsecond delay from the leading edge of pulse 34 to the leading edge of pulse 33. As illustrated the pulse of curve C has a rise time of 1.0 to 1.5 microseconds. This pulse, or a delayed counter part thereof, is normally applied to a channel demodulator having circuitry such that the operation thereof will be initiated a given distance down the slope of curve C, approximately 0.5 microsecond, which is indicated at points 35 and 35a of curves C and E. Once the operation of the circuitry of demodulator 32 has been initiated, a rise time of .5 microsecond is experienced before reaching a maximum amplitude or flat portion of the demodulation curve, curve E. This flat portion has a duration of approximately 2.0 microseconds before the demodulator is in condition to respond to the leading edge of a quiescent pulse, such as pulse 34 of the marker signal. These various times outlined hereinabove are the circuit delay times before reaching a point wherein a width modulation may be obtained from the time positioned pulses to be demodulated. Performing an addition of the various indicated duration times, 1.3+.5+.5+2=4.3, indicates the amount of delay necessarily imparted to the marker signal for demodulation thereof, said delay being indicated in curve D. The coupling of the delayed marker signal to the circuitry of demodulator 32, 4.3 microseconds after the operation of the circuit was initiated will cause the circuitry to be returned to its previous condition. Any noise carried by the marker signal, as a time modulation, will be indicated by a change of position of line 36, curve E, resulting in a width modulated pulse. The resulting width modulated pulse is then coupled to a filter which extracts therefrom the audio or amplitude varying component.

Noise present on the marker signal is representative of the noise present on the other channel pulses in the train of pulses and, thus, the biasing of switch 30 and the output means of the monitor 26 may be adjusted such that noise above a given level will cause switch 30 to become operative producing a voltage having sufficient negative amplitude to block the operation of tone receivers 22–25. The amplitude varying output of demodulator 32 is applied to amplifier 37. An increase of noise energy level will cause an increase in the conduction of amplifier 37. This increase conduction will increase the conduction of electron discharge or rectifying device 38. As the noise increases the D. C. output at the cathode 39 of electron discharge device 38 will increase, become more positive. This increased positive D. C. voltage will be coupled along conductor 40 to electronic switch 30 overcoming the bias voltage at terminal 41 which cooperates in establishing the given allowable noise level. This causes gas discharge device 42 to fire, or become conductive, placing a negative D. C. voltage on the grids of tone receivers 22, 23, 24 and 25, cutting them off and thus preventing their operation so that the malfunctioning of the PTM system will not cause false relay switching.

Channel monitor 29 is coupled to the output of PTM channel demodulator 15a in a manner enabling this monitor to observe the presence or absence of one or several tones always present in this channel employed for power line relaying. If no tone is present, or one of a plurality of tones is absent from the intelligence derived from demodulator 15a, the electron discharge device 43 will decrease its amount of conduction causing a more positive voltage to be present on the cathode 44 of electron discharge or rectifying device 45 reducing the conduction thereof and as a consequence will provide an increasing positive voltage from the anode 46 of electron discharge device 45. This increasing positive voltage in the absence of the tone signals is conducted along conductor 47 to gas discharge device 48 of switch 30 overcoming the bias voltage at terminal 41. This causes gas discharge device 48 to fire, or become conductive, placing a negative D. C. voltage on the input to the tone receivers with sufficient amplitude to block or stop their operation to prevent false relaying resulting from malfunctioning of the microwave system.

It will be obvious to those skilled in the art that the inclusion of the control means 3 will substantially eliminate false power line relaying operations caused by practically any possible combination of PTM malfunctioning and thereby provide a more efficient power line relaying operation on microwave relay systems of the PTM type.

While I have described above the principles of my invention in connection with specific apparatus, it is to be clearly understood that this description is made only by way of example and not as a limitation to the scope of my invention as set forth in the objects thereof and in the accompanying claims.

I claim:

1. A communication system comprising transmitting means for transmitting a train of signal pulses representing a marker signal and intelligence modulated pulses of at least one channel, receiving means for receiving said train of signal pulses including means for separating the marker signal from the pulses of said channel, demodulating means for demodulating the pulses of said channel for signal recovery, utilization means, means to apply the recovered signal to said utilization means, and means to control operation of said utilization means, said control means including means for detecting noise energy modulating said marker signal and means responsive to the detected noise energy above a given level to block operation of said utilization means.

2. A system according to claim 1, wherein said means for detecting noise energy comprises a demodulating means for demodulating said marker signal, means for coupling said train of signal pulses to said last mentioned demodulating means including means for delaying said train a predetermined time, means to apply the separated marker signal for gating of said last mentioned demodulating means for recovery of the noise energy modulating said marker signal, and output means to rectify the output of said last mentioned demodulator for producing a direct current control voltage directly proportional to the amplitude of the detected noise energy.

3. A system according to claim 2, wherein said means responsive to the detected noise energy includes a gas discharge device, biasing means to maintain said gas discharge device normally non-conductive, means for coupling said control voltage to render said discharge device conductive when the given level of said noise energy is exceeded, the conduction of said discharge device producing a negative output voltage and means to couple said negative voltage to said utilization means.

4. A system according to claim 1, wherein said control means further includes means for detecting modulation on the pulses of said channel and means to apply in absence of a modulation signal of predetermined intensity a voltage to block operation of said utilization means.

5. A system according to claim 4, wherein said means for detecting modulation comprises a signal amplifier, means for coupling the recovered channel modulation to said signal amplifier and means for rectifying the output of said amplifier to develop a control voltage inversely related to the level of said detected modulation.

6. A system according to claim 5, wherein said means to apply in absence of a modulation signal comprises a gas discharge device, biasing means to maintain said discharge device normally non-conductive, means coupling said control voltage to render said discharge device conductive in the absence of modulation signal of predetermined intensity, the conduction of said discharge device producing a negative voltage, and means for coupling said negative voltage to said utilization means.

7. A multichannel pulse communication system comprising transmitting means for transmitting a marker pulse signal and a plurality of modulated channel pulses in a given time relation as a train of pulses, said transmitting means including modulating means for modulating at least one of the channel pulses in accordance with a predetermined tone signal, receiving means for receiving said train of pulses including means for separating said marker signal from said train of pulses, demodulating means for demodulating said train of pulses for signal recovery of the modulation of said plurality of modulated channel pulses, tone utilization means, means to apply the recovered tone signal to said tone utilization means, and means to control operation of said tone utilization means, said control means including means for detecting noise energy on said marker signal, means for detecting the absence of said tone signal and means responsive to the detected absence of said tone signal and the detected noise energy exceeding a given level to disable the operation of said tone utilization means.

8. A system according to claim 7, wherein said means responsive comprises an electronic switch including first and second gas discharge devices, means coupling said first gas discharge device to said means for detecting noise energy, means for coupling said second gas discharge device to said means for detecting the absence of said tone signal, biasing means common to both said first and second discharge devices rendering them normally non-conductive, and output means common to both said first and second discharge devices whereby said first and second discharge devices are rendered conductive by their respective means for detecting to develop a voltage at said output means for blocking operation of said tone utilization means.

9. A communication system comprising transmitting means for transmitting a plurality of intelligence modulated signals, receiving means for receiving said plurality of modulated signals, demodulating means coupled to said receiving means for demodulating said intelligence modulated signals for signal recovery, utilization means, means to apply the recovered signal from said demodulating means to said utilization means, and means to control operation of said utilization means, said control means including modulation detecting means coupled to the output of said demodulator means for detecting modulation of said modulated signals and means coupled to said modulation detecting means and actuated upon the amplitude of the modulating signal falling below a predetermined level to apply a voltage to block operation of said utilization means, said means for detecting modulation comprises a signal amplifier, means for coupling the recovered signal modulation to said signal amplifier and means for rectifying the output of said amplifier to develop a control voltage inversely proportional to the level of said detected modulation.

10. A system according to claim 9, wherein said means coupled to said modulation detecting means comprises a gas discharge device, biasing means to maintain said discharge device normally non-conductive, means coupling said control voltage to render said discharge device conductive when the amplitude of the modulating signal falls below said predetermined level, the conduction of said discharge device producing a negative voltage, and means for coupling said negative voltage to said utilization means.

References Cited in the file of this patent

UNITED STATES PATENTS

| | | |
|---|---|---|
| 2,162,268 | Meszar | June 13, 1939 |
| 2,229,097 | Koenig | Jan. 21, 1941 |
| 2,258,654 | Koenig | Oct. 14, 1941 |
| 2,307,771 | Denton | Jan. 12, 1943 |
| 2,522,130 | Pfleger | Sept. 12, 1950 |
| 2,553,910 | Gaffney | May 22, 1951 |
| 2,592,737 | Reynolds | Apr. 15, 1952 |
| 2,602,852 | Lense | July 8, 1952 |
| 2,643,369 | Manley | June 23, 1953 |
| 2,677,122 | Gardner | Apr. 27, 1954 |